(12) United States Patent
Teahan (10) Patent No.: US 10,105,009 B2
(45) Date of Patent: Oct. 23, 2018

(54) VARIABLE SPEED COFFEE GRINDER

(71) Applicant: Michael Teahan, Glendale, CA (US)

(72) Inventor: Michael Teahan, Glendale, CA (US)

( * ) Notice: Subject to any disclaimer, the term of this patent is extended or adjusted under 35 U.S.C. 154(b) by 463 days.

(21) Appl. No.: 15/019,869

(22) Filed: Mar. 7, 2016

(65) Prior Publication Data

US 2016/0220067 A1    Aug. 4, 2016

Related U.S. Application Data

(60) Provisional application No. 62/109,856, filed on Jan. 30, 2015.

(51) Int. Cl.
| | |
|---|---|
| *A47J 42/44* | (2006.01) |
| *A47J 42/08* | (2006.01) |
| *A47J 42/46* | (2006.01) |
| *A47J 42/38* | (2006.01) |
| *A47J 31/42* | (2006.01) |

(52) U.S. Cl.
CPC .............. *A47J 42/44* (2013.01); *A47J 42/08* (2013.01); *A47J 42/38* (2013.01); *A47J 42/46* (2013.01); *A47J 31/42* (2013.01)

(58) Field of Classification Search
CPC ............. A47J 42/38; A47J 42/44; A47J 42/08
See application file for complete search history.

(56) References Cited

U.S. PATENT DOCUMENTS

| | | | | |
|---|---|---|---|---|
| 2014/0123857 A1* | 5/2014 | Rego | ........................ | A47J 42/38 99/280 |
| 2014/0203118 A1* | 7/2014 | Rego | ........................ | A47J 42/44 241/6 |
| 2015/0102149 A1* | 4/2015 | Hsiao | ........................ | A47J 42/46 241/258 |
| 2016/0143481 A1* | 5/2016 | Merelli | ..................... | A47J 42/44 241/34 |
| 2016/0192809 A1* | 7/2016 | Bakke | ....................... | A47J 42/06 241/101.2 |
| 2016/0374513 A1* | 12/2016 | Rego | ........................ | A47J 42/40 99/280 |
| 2018/0055275 A1* | 3/2018 | Bianchi | ............... | A47J 31/4403 |

* cited by examiner

*Primary Examiner* — Daniel J Colilla (57) ABSTRACT

The present invention is an improved method to grind coffee where grinding speed can be adjusted either on demand or according to a programmed profile. By lowering the rotational speed of the grinding burrs, the user can insure more consistent particle size for types of coffee or methods of brewing where it is desirable, or dramatically increase speed for greater productivity. By incorporating a load cell, the grinder is able to identify coffee brewing device and deliver portioned ground coffee according to program settings or user input. The device also features an improved hopper design to reduce waste and ease whole bean removal. More importantly is a new method to calibrate the distance between the grinder mills and to automatically adjust grinder particle size so that a given numerical value is consistent for each grinder and every user.

20 Claims, 6 Drawing Sheets

VARIABLE SPEED COFFEE GRINDER

This application for a Utility patent claims benefit of a prior application for provisional patent No. 62/109,856 filed Jan. 30, 2015.

BACKGROUND OF THE INVENTION

It is commonly understood in the coffee industry that different varieties of roasted coffee and methods of brewing coffee require a specific particle size of ground coffee and specific ration of ground coffee to water and to achieve optimal results. The precision required for some coffees requires a slower grinding speed than is customary to ensure that the coffee beans are cut rather than crushed by the grinding mechanism. Existing coffee grinders are not able to vary the speed on demand for each kind of coffee being ground or accurately adjust the quantity of coffee delivered to accommodate different brewing methods. Grinders that are able to grind coffee to order use time as a method of measurement must be continuously be adjusted when grind settings are changed. Using time as a means of measuring ground coffee is impossible if a grinder is to be used for anything other than a single type of coffee brewing method.

Historically, coffee grinders are comprised of a container to hold whole coffee beans above the grinding mechanism. In order to facilitate cleaning of this container, removing or replacing the coffee beans, a closing mechanism is required to stop the flow of coffee and the container is removed. Fragile bean containers often break when being handled once removed from the machine and excess quantity of coffee beans remain in the grinder and must be ground and discarded.

Coffee Shop owners and roasters have long sought viable methods to track coffee consumption and record usage data in order to properly schedule maintenance of their machines and manage inventory. Previous attempts to record data include simple counters on coffee grinder dosing lever, but these grinders often require more than one pulls on the dispensing lever to deliver the correct amount of coffee. Espresso coffee machines are often equipped with devices to count the number of times a button is pushed to dispense coffee, but these machines are unable to differentiate between a button pressed deliver coffee and one simply to rinse between servings. This inaccurate data is kept on the machine itself and there is no facility to automatically collect and analyze usage information. Grinders used to prepare coffee for methods other than espresso have no means of gathering coffee consumption data either by quantity or brewing method.

Existing systems that attempt to control the delivery of food product in food preparation have used time for portion control cannot accurately measure consumption and no means to log or deliver usage data to coffee roasters or store managers.

Most importantly, no accurate means exists to calibrate the distance between the grinding mills so that the numeric indicator of the grind setting on one grinder is consistent with any other grinder.

SUMMARY OF THE INVENTION

The present invention is an improved method and apparatus to grind coffee where grinding speed can be adjusted either on demand or according to a programmed profile. By lowering the rotational speed of the grinding burrs, the user can insure more consistent particle size for types of coffee or methods of brewing where it is desirable. When a more diverse coffee particle size is desired or when speed of operation is more important than consistent particle size, the grinder can operate at a much higher rotational speed. Because programming a variety of settings can be time consuming, pre-programmed settings can be entered remotely using an internet connection and delivered to any number of grinders at one time. The grinder is optionally accessible remotely via the internet for programming and accessing usage data.

Using an integrated load cell and platform provide the user the ability to portion ground coffee by weight. Additionally, using a load cell allows the grinder to identify the type of brewing device placed upon the platform by the weight of the device, preloading the program tailored to that device and the type of coffee selected. The grinder is then able to adjust the speed of the motor and the particle size of the ground coffee automatically.

To simplify handling of unground coffee beans, the whole bean hopper is designed to slide towards the user to remove unground coffee beans from the device without removing the bean coffee container from the grinding apparatus. This also reduces the distance between the outlet of the hopper and the grinding burrs to minimize the amount of coffee left in the machine and reduce waste.

The ability via motorized mechanism to automatically adjust the distance between the two grinding mills according to pre-programmed settings, manually entered values or in response to data collected from external devices. More importantly, the ability to calibrate the adjustment mechanism by moving the grinding mills towards each other until they come together and stop, thereby establishing a zero set point from which all grinder settings will be calculated.

The calibrating can further include calculating the distance between the grinding burrs to create a uniform standard so that all grinders may use the same settings to deliver the same particle size according to a preset value or program.

DETAILED DESCRIPTION OF THE INVENTION

Figure 1:
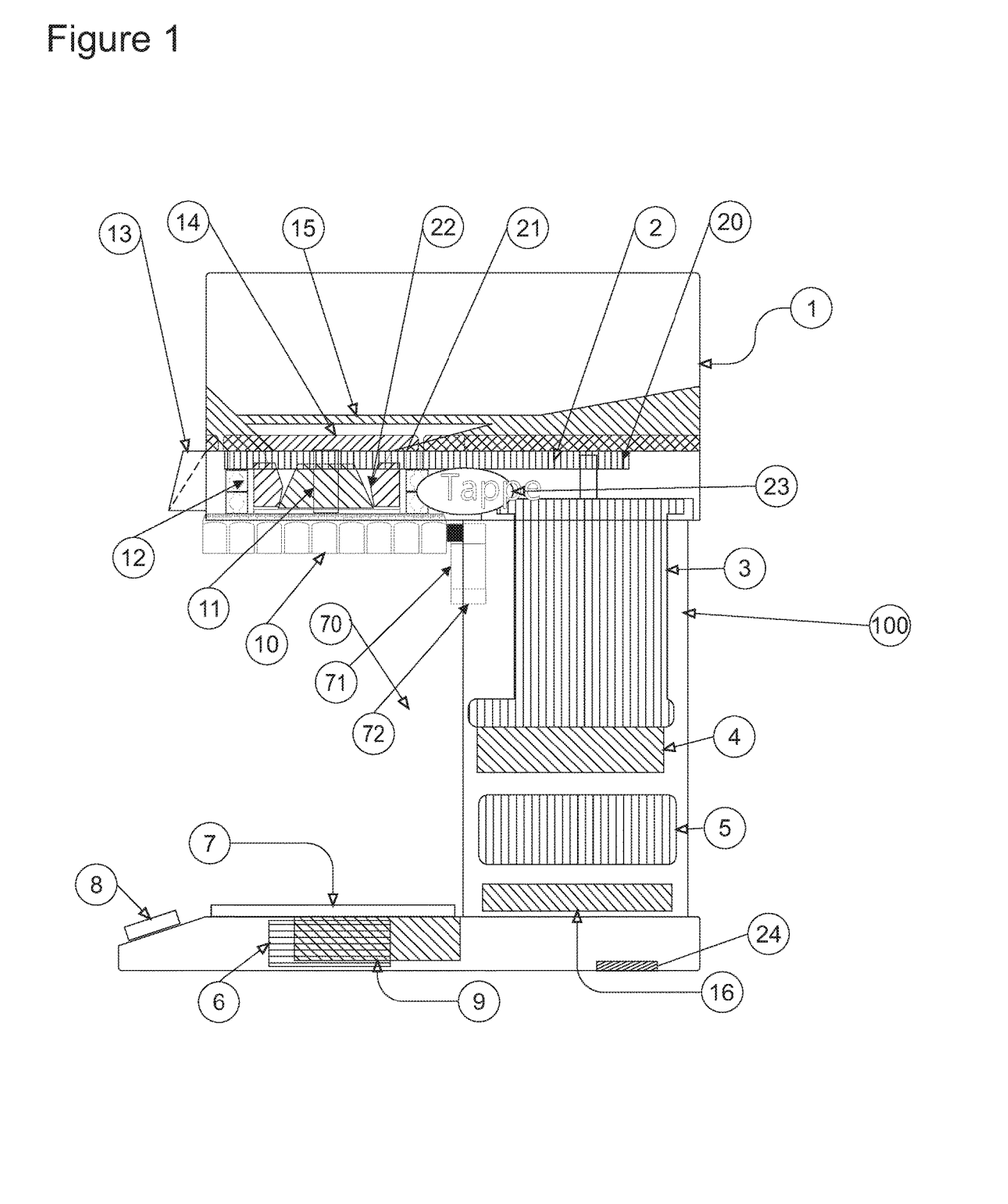
FIG. 1 is a side view of one embodiment of the variable speed grinder.

FIG. 1 shows a side view of one embodiment of a coffee grinder 100 with receptacle for whole coffee beans 1, a flexible drive belt 2 to convey power from the motor 3 and drive gear 20 to the grinder burr carrier 21 to rotate the outer portion of a grinding mechanism 22. A cooling fan 4 is fixed to the base of the drive motor 3. A toroidal transformer 5 and bridge rectifier 24 to power the drive motor 3. A computer circuit board 16 controls the speed and torque profile to the drive motor 3. A capacitor 6 to regulate the power coming from the transformer 5. A load cell 9 to measure the weight of dispensed product on platform 7. A digital encoder 8 to adjust values and parameters controlled by a circuit board 16. An adjustment dial 10 to adjust the height the grinding burr 35 along fixed shaft 11. Two bearings 12 provide support for the grinding mechanism 22, allowing it to rotate around the center shaft 11. A drive belt 2 situated above the two support bearings 12. A chute 13 is attached to the front of the grinder 100 and below the hopper 1. A guide bar 14 supports the fixed shaft 11 and aligns the hopper 1 to the grinder 100. Finger guards 15 are molded into hopper 1.

A coffee grinder with a variable speed motor 3 can grind finely ground coffee more precisely and consistently at lower speeds than conventional high-speed grinders. Different methods of brewing coffee such as espresso coffee require that coffee beans be cut into consistent particles of even distribution. Existing coffee grinders spinning at high rates of speed tend to crush the coffee beans rather than cut them, especially when the motor starts resulting in an inconsistent particle size. Shown in FIG. 100 is an embodiment of a coffee grinder that overcomes the challenges of consistent coffee particle size by using a variable speed motor whose speed and starting torque characteristics can be adjusted via a programmable controller 16 to accommodate a variety of coffee preparation methods or coffee bean types while retaining the ability to grind at high speeds when precision is unnecessary.

Additionally, once coffee is ground it begins to oxidize rapidly and lose much of its flavor and aroma. A grinder that processes only as much coffee as is required and dispenses it directly from the grinding mill 22 unobstructed into a brewing device or filter holder eliminates waste and provides for the immediate consumption of ground coffee. The ability to grind coffee as needed and in the precise quantity required is key to ensuring quality. While some grinders use time to portion coffee, the rate at which coffee is ground varies with the particle size required and the hardness of the bean. Using a load cell 9 and platform 7 to portion the coffee allows for a wide variety of coffee types and brewing methods to be accurately ground and portioned for each application. The ability to program these values via a programmable controller 16 ensures consistency regardless of user and speeds the delivery of a variety of coffees custom tailored to each customer's needs.

Coffee mills of a conical design 22 allow the coffee to be ground and dispensed directly from the bottom of the mill 10 and into a filter holder or receptacle. In order to facilitate an unobstructed flow of coffee in to the mill, the outer grinding surface must be rotated against a fixed internal grinding cone. The placement of the drive belt 2 above the two bearings 12 improves upon existing designs by allowing the belt 2 to be replaced without removing the grinder burr carrier assembly 21.

The exemplified embodiment further improves upon existing designs by using a DC motor drive 3 that adjusts torque in response to the load on the burr carrier assembly 21 eliminating the need to use additional gear reduction assemblies the previously were required to maintain burr speed. Reducing the number of parts needed improves reliability and eases future service to the internal components.

The variety of grind settings and weights required for different brewing methods and coffee types can generate hundreds of combinations. The exemplified embodiment of this invention stores these different combinations as preset values in circuit board 16 and connects wirelessly to external devices so that these values can be programmed remotely and downloaded to one or a multitude of coffee grinders at one time. The programmed values are accessible by the user via the rotary encoder 8.

In the exemplified embodiment of the invention, coffee beans are stored in the hopper 1 and flow towards the grinding burrs 22, whose outer section rotates around an axially fixed center burr secured to center shaft 11. The adjustment dial 10 moves the center burr up and down along center shaft 11 adjusting the distance between the center burr and the rotating outer burr 22, resulting in fine or more coarsely ground coffee. The ground coffee passes through tapered openings in the adjustment ring 10 onto coffee tray 7. All ground coffee is dispensed and no residual coffee remains ensuring freshness and eliminating waste.

An electronic position encoder 72 is attached to an electric stepper or servo motor 71 which in turn drives two pinch rollers 70 to cause the adjustment dial 10 to rotate, thereby adjusting the particle size of the ground coffee. The rotary encoder 72 is always under power to monitor the position of the adjustment dial 10 even if said dial is manually rotated without the use of the stepper motor 71 or the two pinch rollers 70.

Coffee is the second largest internationally traded commodity after oil and monitoring consumption and inventory levels for both retailers and roasters is important. The electronic circuit board 16 monitors usage data for all programmed functions of the grinder and uploads that data on demand or in real time to the Internet. In addition to usage data, the system can send text alerts or emails regarding inventory levels or call for service either automatically or when initiated by the user via text message, email or other electronic means.

The height of the grinder 100 is designed to accommodate the most common filter holders and brewing devices, but can manufactured with varying heights to accommodate coffee bags or large containers according to a customer's needs.

Figure 2:
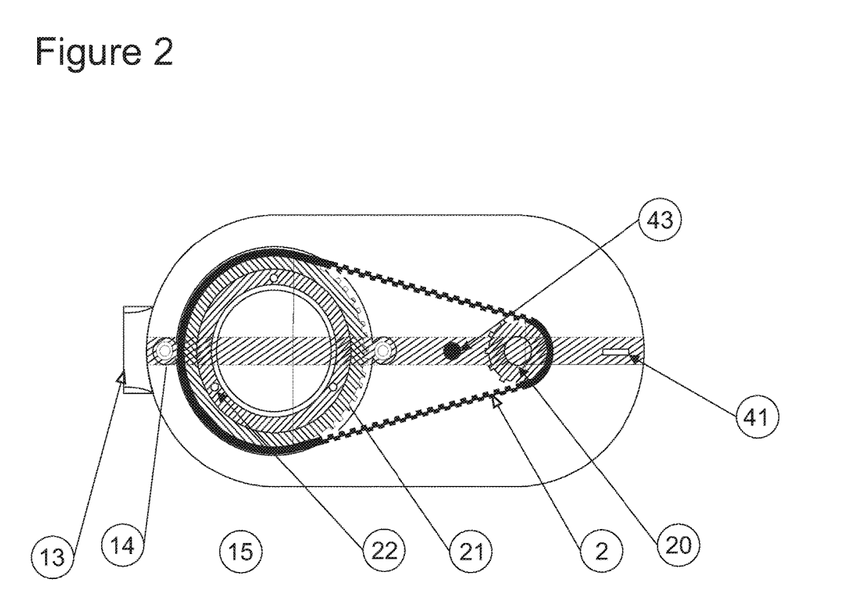
FIG. 2 is a top view of the drive mechanism for the variable speed grinder.

FIG. 2 is a top view of the drive mechanism for the variable speed grinder showing the motor driven primary pulley gear 20 driving the flexible belt 2 and passing power to the larger gear driven grinding mill carrier assembly 21 and grinder burr 22. A supporting bar 14 is mounted to the assembly and supports the center non-rotating portion of the burr assembly. Magnet 43 is positioned along the support bar to index the position of a sliding coffee bean hopper along with a reed switch 41 or similar sensor to remove power from the motor assembly when the coffee bean hopper has been removed or slid out of operating position. A molded chute 31 is attached to one side of the grinder to facilitate the removal of un-ground whole coffee beans from the grinder.

Using high torque DC motor allows for a larger primary drive gear 20 to drive the burr carrier 21 with more contact between the gears 20 and 21 and the belt 2. It also allows for an approximate three-fold increase in torque without additional gear reduction assemblies.

Figure 3:
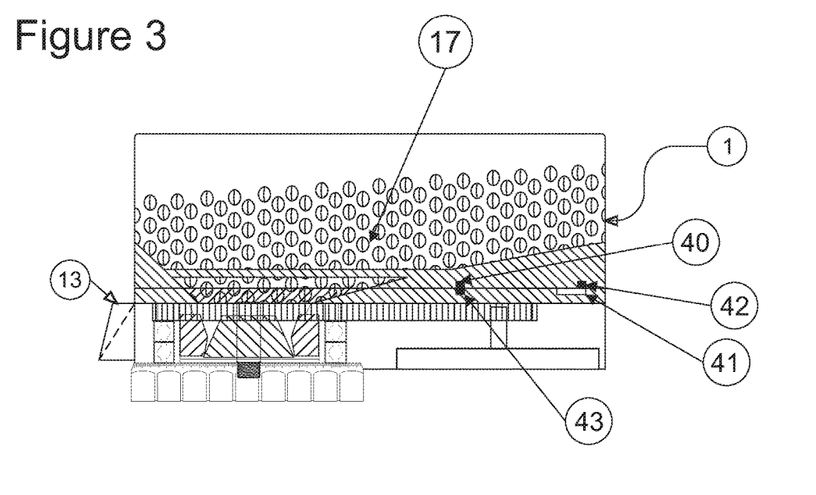
FIG. 3 is a detailed side view of the sliding bean hopper mechanism in its closed position.

FIG. 3 is a detailed side view of the sliding bean hopper mechanism 1, holding whole coffee beans 17 and bean chute 13. Magnets 40 and 43 secure the hopper 1 into position and reed switch 41 detects the position of magnet 42.

A coffee grinder that is capable of grinding a variety of coffee types needs to facilitate the removal of unground coffee beans with a minimum of waste. Prior embodiments of coffee grinders require the removal of the bean holder from the machine. A stopping device in a bean holder, commonly known as a hopper, interrupted the flow of beans to facilitate removal from the machine, but a significant amount of coffee beans remain in the space above the coffee mills which have to be ground in order to remove resulting in a significant amount of waste. Hoppers are typically plastic or glass and handling them away from the machine provides an opportunity for the operator to drop the hopper, which are easily broken and rendered unusable. Index magnets 40 and 43 attract to each other and force the alignment of the hopper opening with the grinding mechanism. Index magnet 42 activates the reed switch 41 when the hopper is in proper position and signals the electronic board to allow the grinder to activate.

Figure 4:
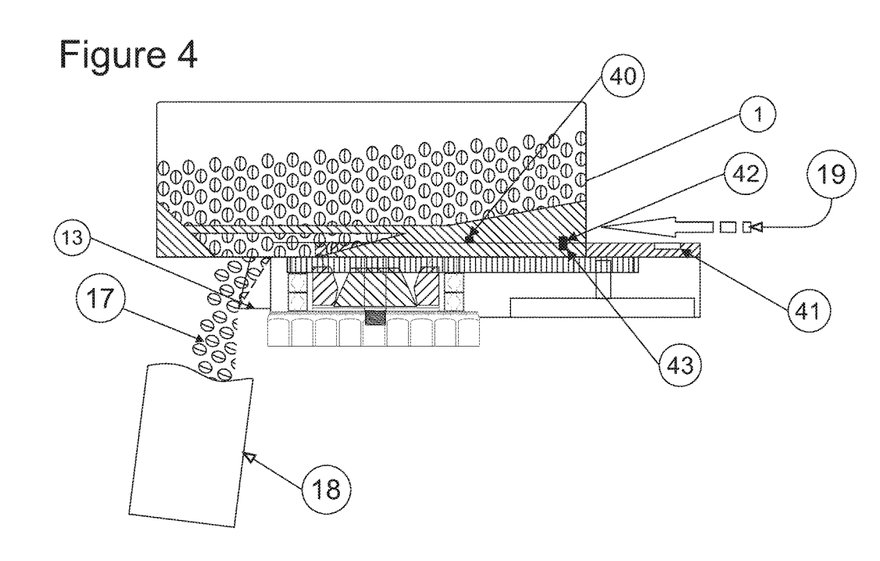
FIG. 4 is a side view of the sliding hopper mechanism in its open position.

FIG. 4 shows the side view of the hopper mechanism 1 slid forward 19 to allow the coffee to flow from the bottom of the hopper via chute 13 into a container 18.

The current embodiment of the grinder 100 improves on existing designs using a sliding hopper design 1 with a gliding motion 19 to allow the coffee to be removed from the grinder without removing said hopper from the machine.

To remove coffee beans, the hopper is slid forward until index magnet 42 aligns with magnet 43 and stops the hopper in the correct position to remove unused coffee beans via chute 13. Index magnet 42 moves away from reed switch 41 and prevents the motor from operating while the hopper is either out of position or removed. The sliding action 19 also eliminates the need for a neck or support structure found on existing grinder hoppers reducing the amount of unground beans left in the grinder.

Figure 5:
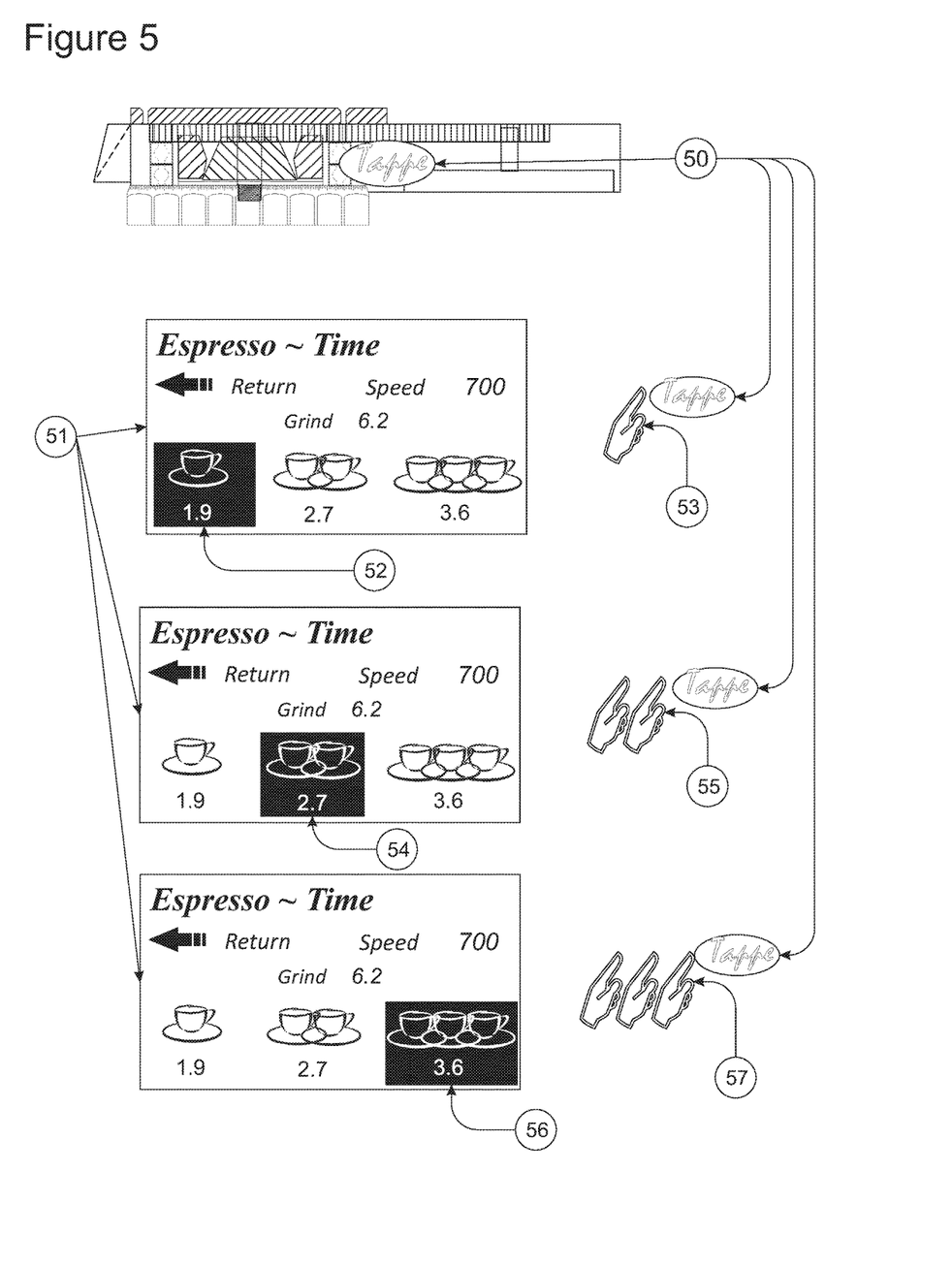
FIG. 5 is a side view of the grinder detailing the activation switch and operation.

FIG. 5 shows a side view of the grinder mechanism with switch 50 of a capacitive, micro or similar construction. A graphical display is shown 51 with three different selections 52, 54 and 56 and three input methods for making said selections 53, 55 and 57.

In a busy retail environment, small selector switches that require the visual attention of the operator slow the process of preparing coffee beverages and are prone to error. The proposed invention simplifies the selection process with a single large switch 50 on the side of the grinder mechanism. Touching the switch in a pattern activates the grinder's preset values to deliver the desired amount of coffee. Touching the switch a single time indicated by action 53 initiates the grinding process indicated on display 51 and value in the first position 52. Touching the switch twice indicated by action 55 initiates the grinding process for the value in the second position 54. Touching the switch twice indicated by action 57 initiates the grinding process for the value in the second position 56.

Other programs can be entered in a similar fashion, for example continuously touching the switch 50 for more than a preset amount of time, for example two seconds, allows the grinder to run continuously until the switch is touched a subsequent time. The addition of a second switch on the opposite side of the grinder allows for more program options, for example touching both switches at the same time operates the grinder in reverse rotation so that the grinder can be adjusted without wasting coffee beans.

Figure 6:
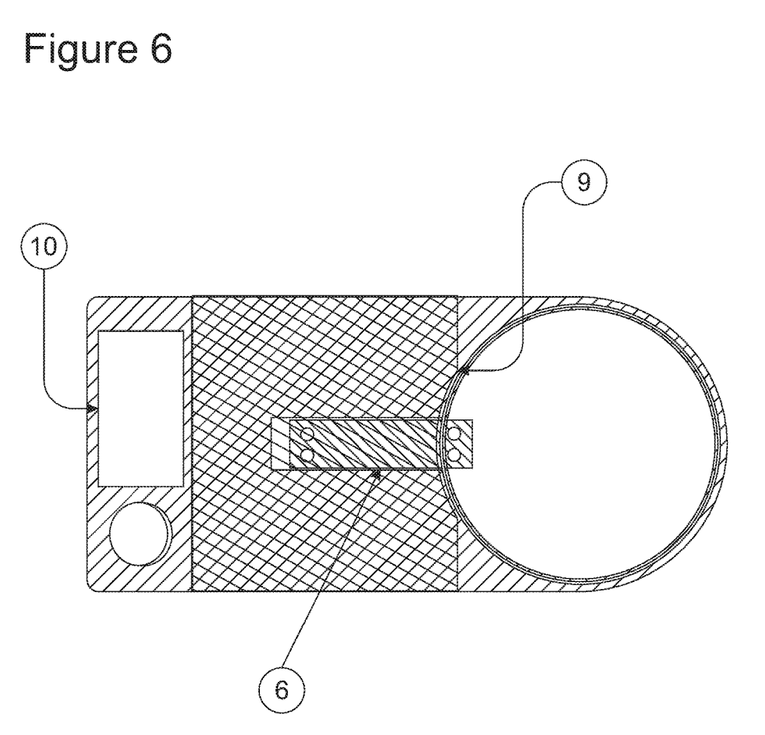
FIG. 6 is a top view of the base of the grinder.

FIG. 6 shows a top view of the base of the grinder with a display 60, encoder 8 and load cell 6. A removable scale platform 7 is shown that will index onto load cell 8. Use of a load cell 8 allows the device to determine, by weight, the type of brewing device that has been placed on the platform 7 and automatically load the program that brewing device requires, adjusting the grind settings and motor speed upon selection by the operator. Automating this process allows a variety of preprogrammed portion settings using a touch sensitive display a single touch sensitive input device, including but not limited to a sequence of taps or a using one or more fingers. The operator can activate the grinding process and program without looking at the display or identifying a specific button to push.

When grinding coffee for espresso, the operator may often prefer to hold the coffee filter with their hand and bypass the load cell 6 and platform 7. When the device is activated without anything placed on the platform 7, the grinder can initiate a programmed delivery based upon time instead of weight. Because the grinder is able to use a rotary encoder to determine particle size and receives speed data from the grinder motor, the grind time can be adjusted to accommodate any change to better insure consistent timed coffee delivery.

The advantages of the present invention include, without limitation, the ability to program preset values via a remote device including but not limited to wifi, Bluetooth or the internet for access on the device; the ability to call for service from the device itself either by staff or initiated by the device itself when self diagnostics register a problem with the device; the ability to track consumption of coffee and wear on components remotely either in batches or in real time and to analyze captured data for inventory and accounting purposes; the ability to record and distribute coffee grinder usage data including an amount of coffee processed, a brewing method intended to be used for the processed coffee, a type of coffee processed, and a time of day the coffee was processed; the ability to grind a variety of coffees for a variety of brewing methods and store the templates for each for ready access by the user; the ability to reverse grinder rotation so that the particle size of the ground coffee can be adjusted without grinding the coffee present in the mill; the ability to accurately weigh each delivery of ground coffee regardless of receptacle employed and the ability to remove unground coffee from the device without removing the bean hopper thereby minimizing the retention of unused coffee in the grinder and minimizing waste.

In broad embodiment, the present invention is more efficient and precise method of delivering coffee on demand than those currently available with data collection and analysis capabilities not currently available in any available coffee grinder.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:
1. A coffee grinder comprising:
a stationary inner coffee grinding burr around which a second outer burr rotates;
a mechanism to adjust the distance between said grinding burrs, a stepper motor to rotate said adjustment mechanism;
a rotary encoder fitted to said stepper motor to measure the position and motion of said adjustment mechanism;
a hopper to hold unground coffee beans;
a load cell to weigh ground coffee;
a variable speed motor to drive said second burr via a timing belt and a gear;
a touch enabled display to adjust grinder settings;
an electronic controller that stores and implements any one of several programmed processes to control the speed of the variable speed motor, the particle size of the ground coffee and the amount of coffee to be delivered, each programmed process being customized for different types of coffee and brewing methods;
a means of recording consumption and usage data and wirelessly transferring that data to the internet;
wherein said electronic controller is capable of receiving data from external devices thereby making adjustments to the particle size and quantity of coffee delivered based on the received data;
and a touch sensor to receive input from a user.

2. A coffee grinder according to claim 1, wherein said second outer burr is attached to the gear and said timing belt drives said gear, and wherein said gear is situated above two semi-permanently fitted bearings to facilitate timing belt replacement without dismantling the grinding mechanism.

3. A method of grinding coffee comprising the steps of:
providing an apparatus including:
a coffee grinder comprising:
a stationary inner coffee grinding burr around which a second outer grinding burr rotates;
a rotary encoder fitted to said stepper motor to measure the position and motion of said adjustment mechanism;
a hopper to hold unground coffee beans;
a touch enable display to adjust grinder settings;
storing and implementing, on an electronic controller, any one of several programmed processes to control the speed of the variable speed motor, the particle size of the ground coffee and the amount of coffee to be delivered, said processes being customized for different types of coffees and brewing methods;
recording consumption and usage data and wirelessly transferring that data to the internet;
collecting data from external devices and adjusting the particle size and quantity of coffee delivered based on said collected data; and
receiving input from a user via a touch sensor.

4. The method of grinding coffee according to claim 3, further comprising the steps of:
manually adjusting the grinding speed or adjusting the grinding speed according to one of the programmed processes stored on the electronic controller at any time prior to or during the grinding process.

5. The method of grinding coffee according to claim 3, further comprising the steps of: accessing the coffee grinder remotely via the internet or an intranet for programming and accessing usage data.

6. The method of grinding coffee according to claim 3, further comprising the steps of:
adjusting a timed delivery of ground coffee in response to changes in rotational speed of the variable speed motor.

7. The method of grinding coffee according to claim 3, further comprising the steps of:
adjusting a timed delivery of ground coffee in response to changes in particle size of the ground coffee.

8. The method of grinding coffee according to claim 3, further comprising the steps of:
accurately portioning ground coffee using an integrated load cell and a platform disposed above the integrated load cell.

9. The method of grinding coffee according to claim 8, further comprising the steps of:
identifying a brewing device, placed on the platform, by a weight the brewing device determined by the integrated load cell and adjusting the coffee grinder settings according to the identified brewing device.

10. The method of grinding coffee according to claim 3, further comprising the steps of:
adjusting the weight and grind settings of the delivered ground coffee in response to data collected from external devices.

11. The method of grinding coffee according to claim 3, further comprising the steps of:
activating a variety of preprogrammed grinding processes to deliver different respective desired portions of ground coffee using a single input sensor, wherein the activating includes a sequence of taps using one or more fingers.

12. The method of grinding coffee according to claim 3, further comprising the steps of:
removing unground coffee beans from the coffee grinder by sliding the hopper relative to the coffee grinder without removing the hopper from the coffee grinder.

13. The method of grinding coffee according to claim 3, further comprising the steps of:
minimizing the amount of unground coffee beans remaining in the apparatus after a coffee bean removal process has been performed.

14. The method of grinding coffee according to claim 3, further comprising the steps of:
delivering all ground coffee directly from the coffee grinder into a brewing device or container.

15. The method of grinding coffee according to claim 3, further comprising the steps of:
adjusting a distance between the stationary inner coffee grinding burr and the second outer grinding burr by rotating the coffee grinder in a reverse rotation without binding the burrs or wasting coffee.

16. The method of grinding coffee according to claim 3, further comprising the steps of:
calibrating the adjustment mechanism by moving the grinding burrs towards each other until they come together and stop; and
recording the position sensed by the rotary encoder, thereby establishing a zero set point from which all coffee grinder settings will be calculated.

17. The method of grinding coffee according to claim 16, further comprising the steps of:
selectively adjusting the distance between the two grinding burrs automatically according to pre-programmed settings with a motorized mechanism or manually without the use of the motorized mechanism.

18. The method of grinding coffee according to claim 16, further comprising the steps of:
calculating the distance between the grinding burrs to create a uniform standard so that all grinders may use the same settings to deliver the same particle size according to a preset value or program.

19. The method of grinding coffee according to claim 16, further comprising the steps of:
automatically adjusting the distance between the two grinding burrs via a motorized mechanism in response to data collected from external devices.

20. The method of grinding coffee according to claim 3, further comprising the steps of:
recording and distributing coffee grinder usage data including an amount of coffee processed, a brewing method intended to be used for the processed coffee, a type of coffee processed, and a time of day the coffee was processed.

* * * * *